United States Patent [19]

Tani et al.

[11] Patent Number: 4,620,094
[45] Date of Patent: Oct. 28, 1986

[54] PHOTOELECTRIC ENCODER

[75] Inventors: Zempei Tani, Tondabayashi; Kiyoshi Ebina, Nara; Osamu Ichikawa, Matsubara; Mamoru Imaizumi, Nagoya, all of Japan

[73] Assignees: Sharp Kabushiki Kaisha, Osaka; Brother Industries, Ltd., Nagoya, both of Japan

[21] Appl. No.: 617,351

[22] Filed: Jun. 5, 1984

[30] Foreign Application Priority Data

Sep. 3, 1983 [JP] Japan ............................ 58-137226[U]

[51] Int. Cl.[4] .............................................. G01D 5/34
[52] U.S. Cl. ................................ 250/231 SE; 250/205
[58] Field of Search ............. 250/205, 231 SE, 237 G; 330/59, 308; 340/347 P

[56] References Cited

U.S. PATENT DOCUMENTS 4,118,129 10/1978 Grundherr .................. 400/157.3 X
4,417,179 11/1983 Fujimura et al. ................ 250/205 X Primary Examiner—Eugene R. LaRoche
Assistant Examiner—Steven J. Mottola
Attorney, Agent, or Firm—Kane, Dalsimer, Kane, Sullivan and Kurucz

[57] ABSTRACT

Disclosed is a photoelectric encoder for providing an electrical pulse signal corresponding to the rotational position and direction of a disk rotor. The encoder possesses a feedback means including a second light sensitive means and associated circuit for obtaining the stabilized output signal thereof in spite of the fluctuation of the power source voltage and/or ambient temperature or adhesion of extraneous substances to light emitting and/or sensing elements and others.

4 Claims, 7 Drawing Figures

PHOTOELECTRIC ENCODER

BACKGROUND OF THE INVENTION

1. FIELD OF THE INVENTION

The present invention relates to a photoelectric encoder capable of stabilizing the output signal thereof despite the fluctuation of operating conditions.

Photoelectric encoders are widely utilized today due to the noncontact type and a variety of advantages including a small load of a rotator, a capability of high-precision positional detection based on the density of the slits in a disk, a compact and lightweight structure, and high reliability in operation.

2. Brief Description of the Prior Art

In the photoelectric encoder, the light emitting elements employed are primarily LEDs (light emitting diodes) and in some cases, incandescent lamps, while silicon photodiodes are used as light sensing elements. Each of such light emitting and sensing elements is affected by the fluctuation of the power source voltage applied thereto and/or ambient temperature or adhesion of extraneous substances such as dirt and others which eventually vary the output. The output variation thus induced causes malfunction of the circuit in the following stage to render the positional detection inaccurate as a result.

SUMMARY OF THE INVENTION

In view of the circumstances mentioned above, an object of this invention resides in providing an improved photoelectric encoder which is capable of producing a stable output notwithstanding any variation occurring in the fluctuations of the applied voltage and/or ambient temperature or adhesion of some extraneous substance such as dirt or any other cause. Another object of this invention is to provide an improved encoder which keeps its output stabilizer circuit free from any disturbance that may be induced by the rotation of a disk.

One feature of the present invention is the provision of a novel photoelectric encoder which generates a stabilized output signal in spite of the fluctuation of the operating conditions.

Due to the feature that the photoelectric encoder described hereinabove is capable of producing a positioning signal from the electronic circuit, it can be used in positioning an operating part in a printer or a sewing machine as well as for providing positional information in a machine tool or the like.

Thus, according to the present invention, the group of light sensing unit for producing a rotation signal and the light sensing element for controlling the light emission output are disposed on mutually different sides with respect to the disk, and in particular the latter element for controlling the light emission output is located on the same side as the light emitting element. Therefore, it becomes possible to assemble the LED drive circuit and the rotation-signal detector circuit individually and separately, hence simplifying the wiring and so forth among the component parts to eventually ensure a satisfactory encoder structure which can be assembled with facility.

These objects and features of the invention will become more readily apparent in the following description of the drawings.

DETAILED DESCRIPTION OF THE PREFERRED EMBODIMENTS OF THE INVENTION

Figure 1:
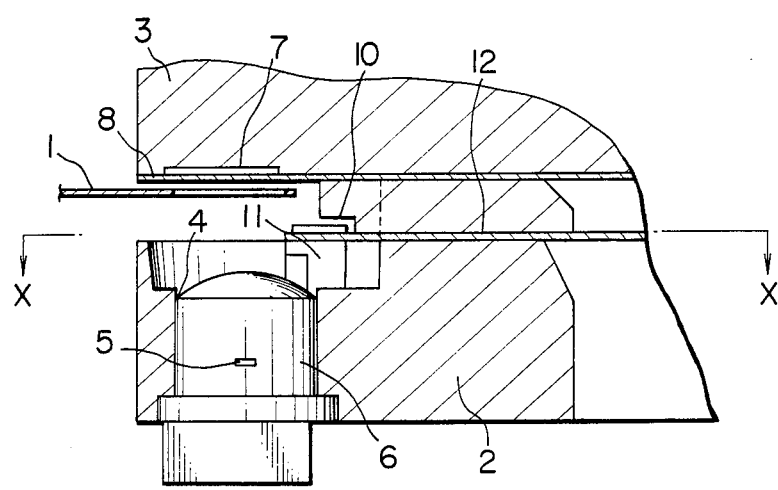
FIG. 1 is a sectional side view showing a first embodiment of the present invention.
Figure 2:
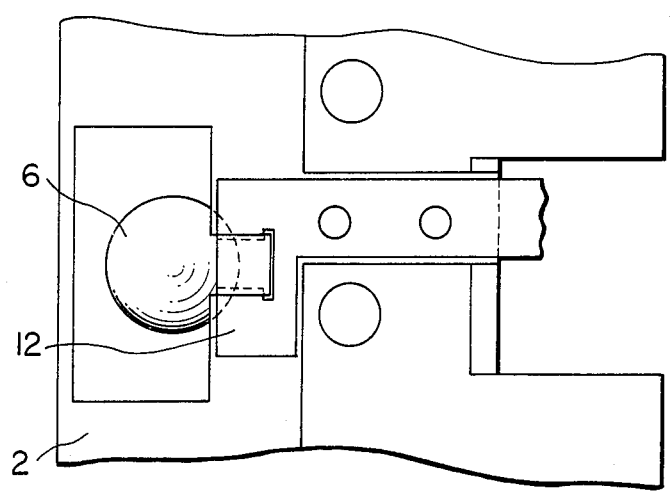
FIG. 2 is a plan view taken on line X—X in FIG. 1.
Figure 3:
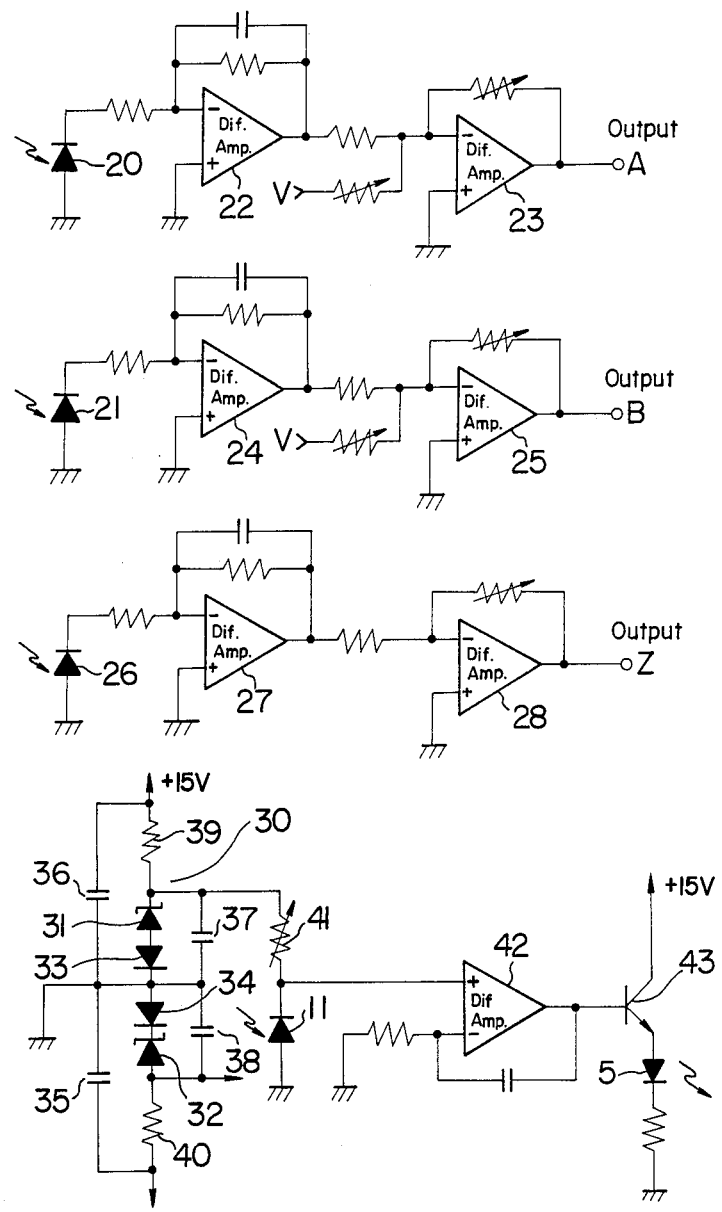
FIG. 3 is a circuit diagram of the first embodiment.

Referring to the attached drawings, in FIGS. 1 and 2, a circular disk 1 of the stainless steel connected directly to a shaft of an unshown rotator has a multiplicity of timing tracks formed in its periphery along the circumference. lhe timing tracks each extending in the radial direction are arranged in a row along the circumference of the disk so as to obtain an incremental output signal at the output terminal of the encoder. The timing tracks are formed by the technique of punching or etching and are arrayed at a high density in conformity with a desired precision. And another track serving as a reference position is located in the vicinity of the track array.

First case 2 housing a light emitting element is disposed on one side of disk 1 while second case 3 housing a light sensing unit is disposed on the other side of disk 1 in such a manner as to sandwich disk 1 therebetween. First case 2 and second case 3 have, in respective unshown regions, a recess and a projection formed integrally with the individual cases and fitted to each other to constitute a single body.

First case 2 and second case 3 are molded by injecting a synthetic resin into metallic dies and have the following structure.

A through hole 4 is formed in first case 2 at a position opposite to the timing track array in disk 1, and a light emitting diode (LED) case 6 incorporating LED chip 5 therein is fitted into the through hole 4 to position the LED element. Element 5 is connected to a circuit substrate via a lead terminal of case 6 and is further connected to a power supply.

Light sensing unit 7 consisting of silicon photodiodes is disposed at a position where case 3 receives the output light of LED element 5 via the timing track in disk 1. Light sensing unit 7 comprises three N-type diffused regions on a P-type substrate so as to have three discrete photodetecting regions. In front of this light sensing unit, there is disposed a stationary mask 8 of stainless steel with a slit formed to have 90° phase difference with respect to the light having passed through the aforesaid timing track in disk 1. Furthermore, the stationary mask 8 has another timing track for producing a reference position signal.

Step 10 is formed in second case 3 at a position adjacent to first case 2 and suited to directly receive a portion of the output light of LED element 5, and light sensing element 11 consisting of a silicon photodiode is disposed in step 10. Light sensing element 11 is attached directly to film substrate 12 composed of polyimide resin. Film substrate 12 extends via a groove formed on the surface of second case 3 and reaches a circuit substrate, and light sensing element 11 is connected electrically to the substrate which incorporates a power supply circuit for LED element 5.

Light sensing unit 7 is constituted of three photodetecting elements, in which the first and second elements 20 and 21 are equipped with amplifiers 22-25 for producing a rotational position detecting output A and a rotational direction detecting output B with a 90° phase difference from each other. At the same time, the third element 26 is equipped with amplifiers 27 and 28 for producing a reference position output Z. Amplifiers 22 and 23 are mounted on the semiconductor substrate where the aforesaid light sensing element is located and form a circuit to detect the rotational information.

Light sensing element 11 is connected to a constant voltage circuit 30 located on the circuit substrate and constituted of Zener diodes 31, 32, diodes 33, 34, capacitors 35-38, resistors 39, 40 and an adjusting resistor 41. The output of light sensing element 11 is connected to the positive terminal of an operational amplifier 42, whose output is fed to the base of output transistor 43, and LED element 5 is connected between the emitter and the ground of transistor 43.

Thus, according to the present invention, the output light of LED element 5 is received by light sensing unit 7 via the timing track in disk 1. Then, the first and second elements of light sensing unit 7 produce position signals A and B, while the third element thereof produces a reference signal Z. Meanwhile, the output of light sensing element 11 serves to control the current fed to LED element 5.

Figure 4:
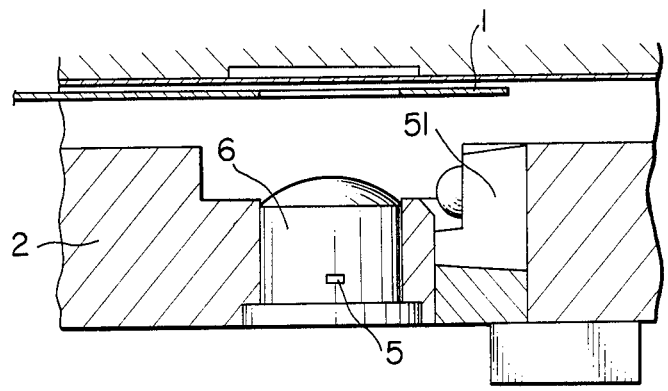
FIG. 4 is a sectional side view showing a second embodiment of the invention.

FIG. 4 shows another embodiment of this invention, wherein light sensing element 51 for control of a LED element in the step of first case 2 so as to receive the light reflected from disk 1. The other circuit configuration is identical with that of the foregoing embodiment of FIGS. 1 and 2 except light sensing element 11.

Figure 5:
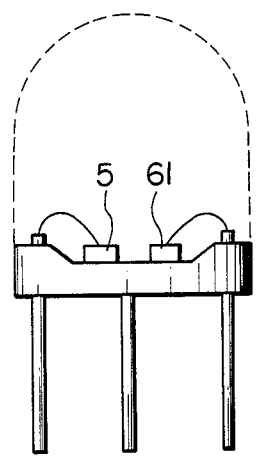
FIGS. 5 and 6 are a sectional view and a circuit diagram respectively showing a third embodiment of the invention; and, FIG. 7 is a circuit diagram showing a fourth embodiment of the invention.
Figure 6:
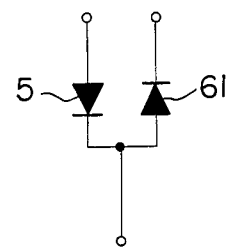

FIGS. 5 and 6 show a further embodiment of this invention, in which both light sensing element 61 for control use and LED element 5 are housed in one package. By properly selecting the positional relationship of light sensing element 61, the light emitted from LED element 5 can be received either directly or through reflection from disk 1, and the output of the LED element is controlled in accordance with the input to light sensing element 61 in such a manner as to maintain the output of element 61 constant. The other circuit configuration is identical with the foregoing one except light sensing element 11 shown in FIGS. 1 and 2.

Figure 7:
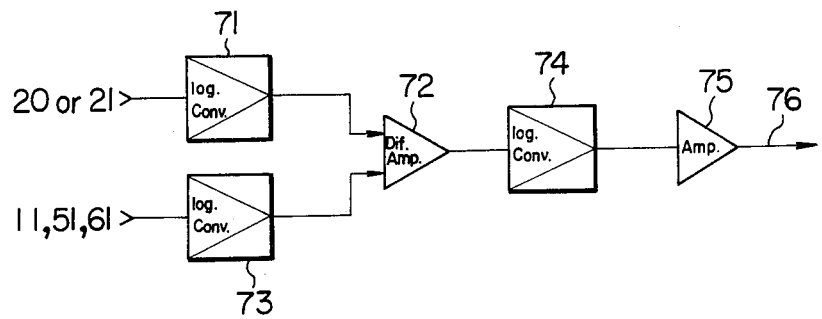

FIG. 7 is a circuit diagram of an even further embodiment according to this invention, in which the output of light sensing element 20 or 21 is fed to logarithmic converter circuit 71, whose output is then fed to one input terminal of differential amplifier 72. In the meanwhile, the output of light sensing elements 11, 51 and 61 are fed via logarithmic amplifier 73 to the other input terminal of the differential amplifier 72. As a result, amplifier 72 produces an output of the value obtained through division of the output of light sensing element 20 or 21 by the outputs of light sensing elements 11, 51 and 61. Consequently, the output of amplifier 72 is maintained substantially constant regardless of any variation occurring in the output of element 20 or 21. The output of amplifier 72 is forwarded to terminal 76 via inverse logarithmic converter 74 and amplifier 75.

What is claimed is:

1. Photoelectric encoder comprising;
    a disk mounted for rotation with an outer circumference and a rotating member, and having a plurality of alternately arranged opaque and translucent portions arranged in a substantially circular timing track about the radial center of said disk;
    a light emitting element disposed on one side of said disk at a position opposite one of said translucent positions, said light emitting element being provided for encoding and for intensity control;
    a light sensitive unit disposed on the other side of said disk and responsive to the angular displacement of said opaque and translucent timing track portions when said rotating member is rotated for generating an output signal to detect the rotational position and the rotational direction;
    the light emitting element and light sensitive element being positioned radially inward from the outer circumference; and
    feedback means for substantially stabilizing the output signal of said light sensitive unit and having a light sensitive means disposed on said one side of said disk at a position to directly receive light radiation emitted by said light emitting element for generating an electrical signal representative of the intensity of said light radiation which may be used to control said intensity.

2. Photoelectric encoder comprising;
    a disk mounted for rotation with an outer circumference and a rotating member, and having a plurality of alternately arranged opaque and translucent portions arranged in a substantially circular timing track about the radial center of said disk;
    a light emitting element disposed on one side of said disk at a position opposite one of said translucent positions, said light emitting element being provided for encoding and for intensity control;
    a light sensitive unit disposed on the other side of said disk and responsive to the angular displacement of said opaque and translucent timing track portions when said rotating member is rotated for generating an output signal to detect the rotational position and the rotational direction;
    the light emitting element and light sensitive element being positioned radially inward from the outer circumference; and
    feedback means for substantially stabilizing the output signal of said light sensitive unit, said feedback means including power means for applying electrical power to said light emitting element; a light sensitive means disposed adjacent to said one side of said disk at a position to directly receive light radiation emitted by said light emitting element for generating an electrical signal representative of the intensity of said light radiation, comparison means for comparing said intensity signal with a reference signal representative of a pre-established desired light intensity; means for generating a correction signal when said intensity signal differs from said reference signal; and means for coupling said signal to said power means to vary the magnitude of said light intensity to re-establish said desired light intensity.

3. Photoelectric encoder comprising:
    a disk mounted for rotation with an outer circumference and a rotating member, and having a plurality of alternately arranged opaque and translucent portions arranged in a substantially circular timing track about the radial center of said disk;
    a light emitting element disposed on one side of said disk at a position opposite one of said translucent positions, said light emitting element being provided for encoding and for intensity control;

a light sensitive unit disposed on the other side of said disk and responsive to the angular displacement of said opaque and translucent timing track portions when said rotating member is rotated for generating an output signal to detect the rotational position and the rotational direction;

the light emitting element and light sensitive element being positioned radially inward from the outer circumference; and feedback means for substantially stabilizing the output signal of said light sensitive unit, said feedback means including power means for applying electrical power to said light emitting element, a light sensitive means disposed adjacent to said one side of said disk at a position to directly receive a light radiation which is emitted by said light emitting element and reflected from said disk or some other position of said apparatus for generating an electrical signal representative of the intensity of said light radiation; comparsion means for comparing said intensity signal with a reference signal representative of a pre-established desired light intensity; means for generating a correction signal when said intensity signal differs from said reference signal; and means for coupling said correction signal to said power means to vary the magnitude of said light intensity to re-establish said desired light intensity.

4. The encoder of claim 1 wherein said light sensitive means is disposed radially inward of said outer circumference.

* * * * *